United States Patent
Hairston et al.

(10) Patent No.: US 12,464,263 B2
(45) Date of Patent: Nov. 4, 2025

(54) PROGRAMMABLE EVENT OUTPUT PIXEL

(71) Applicant: BAE SYSTEMS Information and Electronic Systems Integration Inc., Nashua, NH (US)

(72) Inventors: Allen W. Hairston, Andover, MA (US); Thomas E. Collins, III, Tyngsboro, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 247 days.

(21) Appl. No.: 18/139,573

(22) Filed: Apr. 26, 2023

(65) Prior Publication Data

US 2024/0365025 A1    Oct. 31, 2024

(51) Int. Cl.
*H04N 25/707* (2023.01)
*H04N 25/78* (2023.01)

(52) U.S. Cl.
CPC .......... *H04N 25/707* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 8,421,015 B1 | 4/2013 | Scott | |
| 9,693,035 B2 | 6/2017 | Williams | |
| 9,841,488 B2 | 12/2017 | Thorne | |
| 9,948,880 B2 | 4/2018 | Lund | |
| 10,175,345 B2 | 1/2019 | Rhee | |
| 10,587,826 B2 * | 3/2020 | Stobie | F41G 7/226 |
| 10,827,135 B2 | 11/2020 | Stobie | |
| 10,985,203 B2 | 4/2021 | Wieners | |
| 10,992,895 B2 | 4/2021 | Hairston | |
| 11,729,534 B1 * | 8/2023 | Suess | H04N 25/707 348/302 |
| 2009/0237511 A1 | 9/2009 | Deflumere | |
| 2012/0126121 A1 | 5/2012 | Graham | |
| 2012/0161001 A1 | 6/2012 | Bornfreund | |
| 2012/0261553 A1 * | 10/2012 | Elkind | F41G 7/2293 250/208.1 |
| 2016/0227135 A1 * | 8/2016 | Matolin | H04N 23/71 |

(Continued)

FOREIGN PATENT DOCUMENTS

| | | |
|---|---|---|
| WO | 2012005749 A1 | 1/2012 |
| WO | 2012087716 A2 | 6/2012 |
| WO | 2020112718 A1 | 6/2020 |

OTHER PUBLICATIONS

Title: "Buffer Amplifier" Web: https://web.archive.org/web/20121210072925/https://en.wikipedia.org/wiki/Buffer_amplifier Date: Dec. 10, 2012 (Year: 2012).*

*Primary Examiner* — Twyler L Haskins
*Assistant Examiner* — Wesley J Chiu
(74) *Attorney, Agent, or Firm* — Maine Cernota & Curran (57) ABSTRACT

A neuromorphic focal plane array ROIC device for temporal and spatial synchronous and asynchronous image event processing comprising a plurality of pixels, each pixel comprising an input section comprising a Sample and Hold (SH) component; a low offset buffer/comparator section comprising a Switched Capacitor Filter (SCF); and a digital event output section comprising an analog pixel bus whereby temporal and spatial image data are synchronously and asynchronously processed.

17 Claims, 9 Drawing Sheets

BONDED ROIC FPA STRUCTURE ANALOG AND DIGITAL LAYERS (56) References Cited

U.S. PATENT DOCUMENTS

| | | |
|---|---|---|
| 2018/0091747 A1* | 3/2018 | Rhee .................. G01S 17/89 |
| 2018/0278868 A1 | 9/2018 | Dawson |
| 2019/0141265 A1* | 5/2019 | Finateu .................. H04N 25/77 |
| 2020/0169675 A1* | 5/2020 | Stobie ............... H01L 27/14609 |
| 2020/0169681 A1* | 5/2020 | Stobie .................. H04N 25/47 |
| 2021/0105421 A1 | 4/2021 | Kukreja |

* cited by examiner

BONDED ROIC FPA STRUCTURE ANALOG AND DIGITAL LAYERS
FIG. 1

PIXEL PROCESSING CAPABILITY BLOCK DIAGRAM
FIG. 2

PROCESSOR LAYER INTERFACE TO ROIC LAYER
FIG. 3

PIXEL SCHEMATIC
FIG. 4

INPUT
FIG. 6

700

ANALOG DIFFERENTIAL INPUT COMPARATOR
FIG. 7

DIGITAL COMPARATOR & LATCH DIFFERENTIAL OUTPUT
FIG. 8

COMPARATOR OUTPUT POLARITY SELECTION
FIG. 9

PROGRAMMABLE EVENT OUTPUT PIXEL

FIELD OF THE DISCLOSURE

The following disclosure relates generally to image processing and, more specifically, to a device, system, and method to perform target recognition on the Focal Plane Array (FPA).

BACKGROUND

Digital detection of images is a very widely used technology, having applications ranging from consumer-oriented cameras and video apparatuses to law enforcement and military equipment. For virtually all of these applications, there is a growing demand for higher image pixel counts, higher pixel density, increased sensitivity, improved dynamic range, lower power consumption, faster image processing, and the ability to switch between modes offering different balances of these characteristics, dependent on the requirements present at a given time.

At the heart of all digital imaging systems is the Focal Plane Array (FPA), which is a two-dimensional array of elements upon which an image is focused, whereby each of the FPA elements or pixels develops an analog output signal charge that is proportional to the intensity of the electromagnetic radiation that is impinging on it after a given interval of time. This signal charge can then be stored, measured, and used to produce an image. As understood by one of skill in the art of imaging, FPAs characterized as 'neuromorphic' combine information of many sensors, typically weighted (as with neurons) to produce a higher level output at a lower data rate than a pure pixel output. A neuromorphic FPA acquires data in the form of photocurrent which is passed to the neuromorphic focal array structure through 'synapses' of sensing elements (pixels).

Previous neuromorphic FPAs typically generate events only in response to temporal changes in one pixel, and limited spatial or more complex temporal processing for events. They typically use Dynamic Vision Sensor (DVS) or Address Event Representation (AER) architectures. Many event based cameras use a log domain comparison which results in a sensitivity loss compared to a Background-Limited Infrared Photodetector (BLIP). It is not possible to acquire and process data at needed rates off of the FPA, especially for large format FPAs.

What is needed, therefore, are systems and methods for a neuromorphic focal plane array Read Out Integrated Circuit (ROIC) design for high speed, low power, event based image target detection.

SUMMARY

An embodiment provides a neuromorphic focal plane array (FPA) Read Out Integrated Circuit (ROIC) device for image event processing, comprising a detector array; an analog detection layer; and a digital event processing layer; wherein output of pixels of the detector array is processed by a detector circuit of the analog detection layer, providing a spatio-temporal event detection output to a digital event processing circuit of the digital event processing layer which outputs event information. In embodiments the spatio-temporal event detection comprises temporal and spatial synchronous and asynchronous image event processing, and provides an asynchronous logarithmic output voltage and a synchronous integrated signal output voltage. In other embodiments, the event information comprises detection, tracking, and identification data. In subsequent embodiments an offset capacitor in the detector circuit is configured to store one of the asynchronous output voltage or the synchronous integrated signal output voltage. For additional embodiments the offset capacitor is in series with a threshold switch which selects a threshold voltage input as a calibrated input to a negative input of the comparator. In another embodiment, a comparator in the detector circuit is configured to compare the asynchronous or synchronous output voltage to a programmable threshold to generate an event detection signal in a pixel, which is output from the ROIC. A following embodiment comprises a switched capacitor filter (SCF) in the detector circuit whereby the asynchronous logarithmic output voltage and the synchronous integrated signal output voltage are filtered, thereby generating signals providing an offset or an input to a comparator in the detector circuit. In subsequent embodiments offset calibration is based on either a current detector output; or a current SCF output, and the offset calibration is initiated globally by ROIC layer, or based on the events. In additional embodiments the events are based on a difference detection of detector output or Switched Capacitor Filter (SCF) compared to a previous offset calibration. In included embodiments the detector circuit comprises a dual mode transimpedance stage comprising a Buffered Direct Injection (BDI) input. In yet further embodiments the detector circuit further comprises an analog bus (ABUS) which connects an output of each of a pixel unity gain buffer to an input of the SCF of other pixels, the ABUS comprising horizontal and vertical switches to allow pixels to transfer data to other pixels, with a plurality of pixels transferring simultaneously along different sections of the ABUS, separated by open switches; whereby the events are generated in the pixels of the ROIC by spatial processing comprising comparing the pixel data among pixels selected by the horizontal and vertical switches. In related embodiments the detector circuit comprises a dual mode transimpedance stage comprising a Buffered Direct Injection (BDI) input, an integration capacitor, and a Sample and Hold (SH), whereby an asynchronous log output is produced. For further embodiments the ROIC comprises one amplifier in the pixel, as both a comparator first stage and an analog buffer for processing. In ensuing embodiments, when the comparator is configured to operate as a unity gain buffer, unity gain feedback from an output to a negative input is used to configure the comparator as a unity gain differential follower.

Another embodiment provides a method for neuromorphic image event processing comprising providing a detector input circuit in a Read Out Integrated Circuit (ROIC) comprising an asynchronous logarithmic output and an integrated signal output; providing an offset capacitor circuit configured to store either an asynchronous output voltage or a synchronous output voltage; providing a comparator circuit configured to compare a current detector's asynchronous or synchronous output to the offset capacitor output voltage using a programmable threshold to generate an event detection signal in a pixel, which is output from the ROIC, wherein the comparator is configured to operate as a unity gain buffer; providing an analog bus (ABUS) which connects an output of each of a pixel's unity gain buffers to an input of the SCF of other pixels, the ABUS comprising horizontal and vertical switches to allow pixels to transfer data to other selected pixels, with a plurality of pixels transferring simultaneously along different sections of the ABUS, separated by open switches; providing a switched capacitor filter (SCF) whereby multiple detectors' outputs are filtered, generating signals providing an offset or an input to the comparator, whereby events are generated for output from the ROIC; comparing based on one detector signal input enabling generation of multiple events with different meanings, distinguishable by timing, wherein different comparisons use multiple comparator thresholds; and generating an event detection signal in a pixel, which is output from the ROIC. For yet further embodiments, the different comparisons are based on multiple types of signals generated from one synchronous set of detector data. Other embodiments comprise comparing direct detector output followed by comparing a signal generated by an input of multiple detector inputs to the SCF, including a latest detector output. Continued embodiments include a series of event outputs of a first kind from the comparator that are filtered in the SCF, wherein an output level of the SCF is compared against a programmable voltage to measure a proportion of events of a first kind which are high, generating a second type of event to be read out of the pixel. For additional embodiments, the second type of event is used to make decisions about a sampling time of the first type of event in order to select different thresholds based on a number of events seen within each pixel.

A yet further embodiment provides a neuromorphic focal plane array Read Out Integrated Circuit (ROIC) system for temporal and spatial synchronous and asynchronous image event processing comprising an ROIC layer; a processor pixel layer interfaced with the ROIC layer; and an Analog BUS (ABUS) for data transfer; the ROIC pixel layer comprising a Buffered Direct Injection (BDI) input circuit; a comparator-buffer; a Switched Capacitor Filter (SCF); and an event readout; wherein the BDI input circuit comprises an Integration Sample and Hold Voltage (VSH) capacitor providing temporary storage of SCF data when performing spatial transfers; wherein the ROIC pixel layer comprises one amplifier in a pixel as both a comparator first stage and an analog buffer inside an analog first stage to drive an output cascode FET, isolating inputs from feedback due to Miller capacitance from an active FET gate to drain; whereby events are based on difference detection of detector output or the SCF compared to previous offset calibration, the offset calibration initiated globally by the ROIC layer, or based on a pixel event from the processor pixel layer; whereby temporal and spatial image data events are synchronously and asynchronously processed and output.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Embodiments disclose a new neuromorphic ROIC design for high speed, low power, event-based image target detection, with applicability to a wide application space, including hypersonic detection/tracking and low signal to clutter target detection. They tune sensitivity by changing operating frequency, and perform temporal and spatial processing by comparing stored data to either previous data or to neighboring pixels. The architecture includes a low power analog event detection layer coupled with a digital event processing layer for target detection, identification, and tracking. Signal processing significantly reduces the amount of data transferred off the sensor. The analog event detection layer accomplishes temporal and/or spatial signal processing at selectable frame rates, with low latency, high sensitivity, and at low power. Further, it can be designed into well established and lower cost processing nodes, making the implementation of a sensor utilizing this ROIC realizable from a cost perspective. The inclusion of a linear and logarithmic front end is an improvement over existing event sensors as are pixel level memory and variable filter bandwidth. Embodiments perform target recognition on the FPA, acquiring and processing data at rates that would not be possible to get off the FPA for large format FPAs, creating much smaller Size Weight And Power (SWAP) systems. This can be used for a camera with low latency for hypersonic interceptor applications or for naval warning systems located on boats.

As used herein, events refers to a collection of image data signifying, for example, data above a threshold level of energy. An example of an event is detection of a target by comparing stored data to previous data (temporal), and/or to neighboring pixels (spatial). In addition to detection, events track and identify objects. Further details such as a linear and logarithmic front end, pixel level memory, and variable filter bandwidth used in event detection will be described subsequently.

Figure 1:
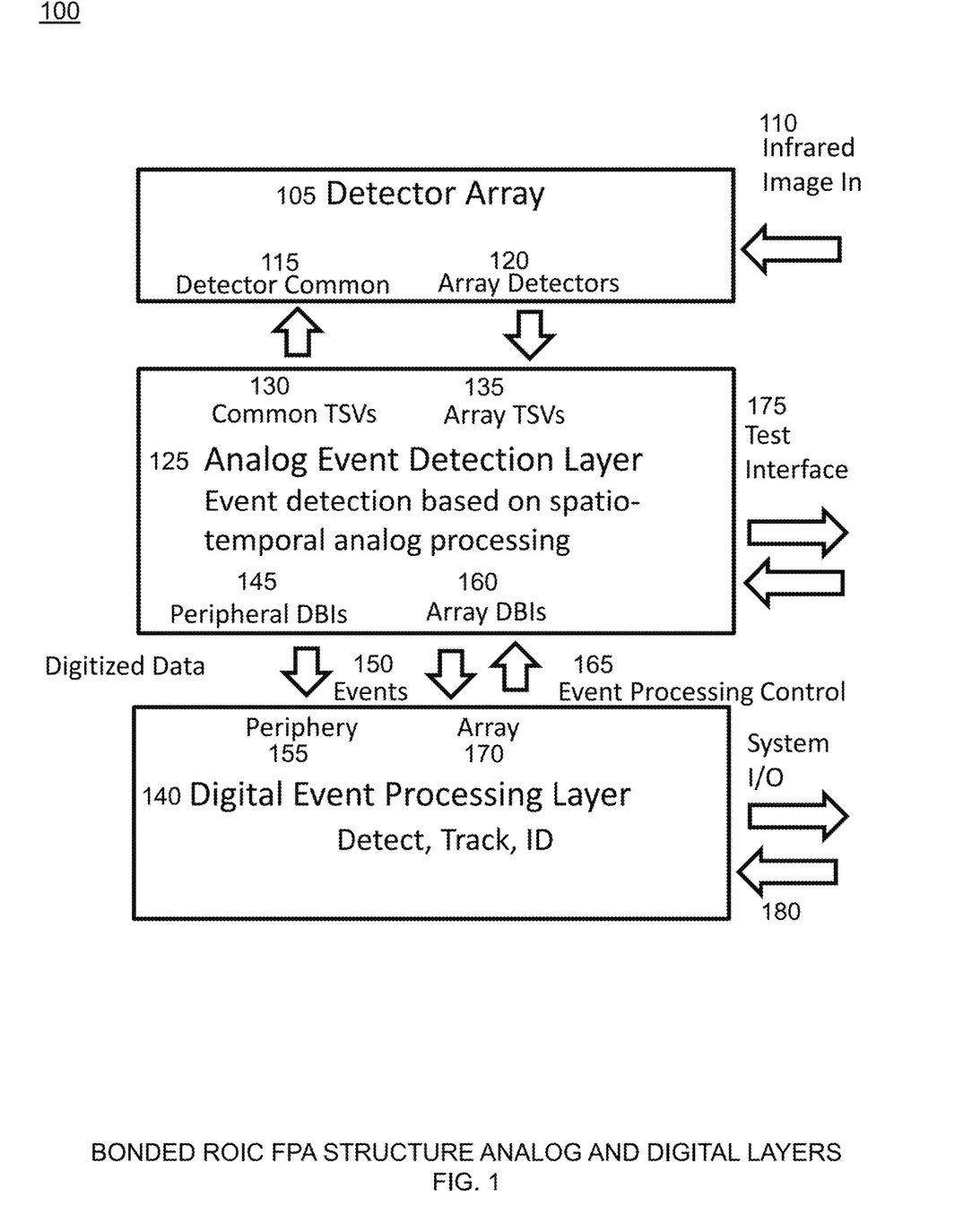
FIG. 1 is a depiction of bonded ROIC FPA structure analog and digital layers configured in accordance with one embodiment.

FIG. 1 is a depiction of a bonded ROIC FPA structure with analog and digital layers 100. A two layer bonded configuration is not required in order to implement the circuitry described, but is one method of fabrication of the following circuits that minimizes pixel size, and embodiments allow more flexibility in terms of devices available in the circuit design. The following circuits in one example are made in a pixel using a single CMOS layer, so the division into two layers is just one embodiment. However, embodiments described herein do include the division of the pixel circuits into two bonded layers. In embodiments, infrared radiation impinges on the infrared detection pixels of Detector Array 105. This infrared radiation has been focused by optics as an Image 110 presented to the pixels of the detector focal plane array. Detector Array 105 is connected to ROIC Analog Event Detection Layer 125. The interface between detector array 105 and Analog Event Detector Layer 125 in one example comprises common Through Silicon Vias (TSVs). Detector Array 105 receives IR radiation 110 of a scene or event, and the output of the Array Detector pixels 120 is sent by the Array TSVs 135 to Analog Event Detection Layer 125. ROIC Analog Event Detection Layer 125 supplies the Detector Common bias 115 to pixels of Detector Array 105 through Common TSVs 130. Detector Common bias is further discussed regarding FIGS. 2 and 8. The ROIC Analog Event Detection Layer 125 is coupled to the Digital Event Processing Layer 140 by electric interconnects such as Direct Bond Interconnects (DBI) with front side to front side bonding.

ROIC Analog Event Detection Layer 125 provides event detection based on spatio-temporal analog processing, and interfaces with Digital Event Processing Layer 140. This interface comprises peripheral Direct Bond Interconnects (DBIs) 145 sending (digital) Events 150 to periphery 155 of Digital Event Processing Layer 140, and Array DBIs 160 exchanging (digital) Event Processing Control 165 with Array 170 of Digital Event Processing Layer 140.

The Analog Event Detection Layer 125 generates events by capturing pixel data at high speed in the pixel array 120, performing temporal and/or spatial processing on the data in the low power analog domain, and outputting events based on pixel comparator triggers on processed outputs. Multiple types of processing and event thresholds are possible on the same frame data. Analog Event Detection Layer 125 can also output image data on request, either raw or processed, at the chip periphery (in embodiments, there is no ADC in the pixel), and has a test interface 175 allowing for access to such data.

Digital Event Processing Layer 140 receives Events 150 generated by Analog Event Detection Layer 125, and provides low latency logical processing of events to identify targets and reject clutter, and includes system I/O 180. Event detection is based on spatio-temporal analog processing. As mentioned, examples of spatio-temporal analog processing include event detection of a target by comparing stored data to previous data (temporal), and/or to neighboring pixels (spatial). The digital event processing layer detects, tracks, and provides identification of objects. In certain embodiments, event processing control is by a pixel block, not individual pixel. Pixel block refers to a group of Nxn (N and n may not have the same value) pixels that may be processed by a regional processor.

Figure 2:
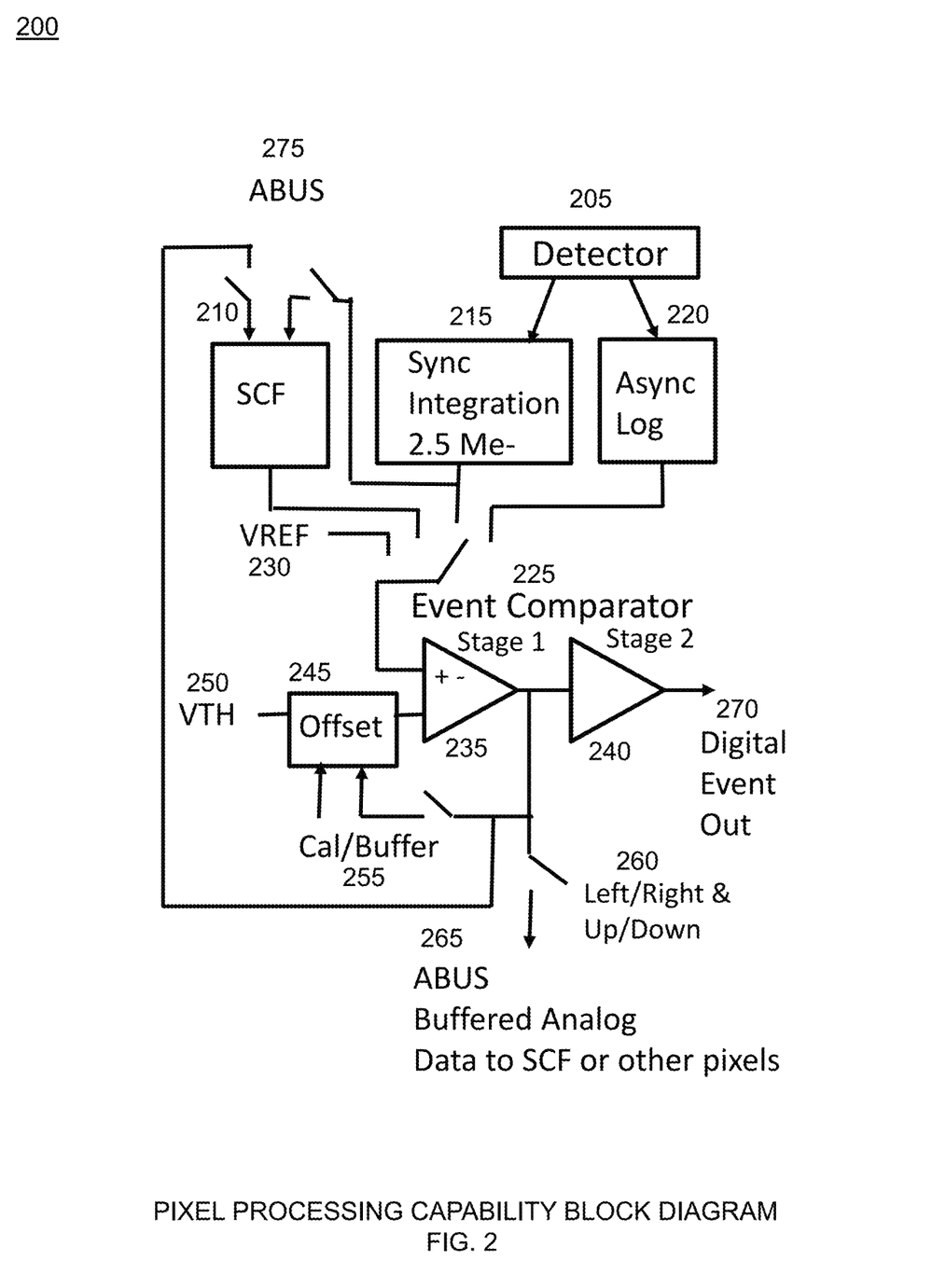
FIG. 2 is a pixel processing capability block diagram configured in accordance with one embodiment.

FIG. 2 is a pixel processing capability block diagram 200. From an interconnection perspective, components comprise: detector 205 and analog bus (ABUS) 265. Detector 205 provides input to Sync Integration 215 and Async Log 220. Analog bus 210 interfaces with Switched Capacitor Filter (SCF) 210. Event comparator 225 receives input from VREF 230, SCF 210, Sync Integration 215, and Async Log 220. Event Comparator 225 comprises Stage 1 235 and Stage 2 240. Further input to Stage 1 235 is Offset 245. Inputs to Offset 245 include VTH 250 and Cal/Buffer 255. Output from stage 1 235 comprises Left/Right & Up/Down 260 and Buffered Analog Data to SCF or other pixel 265 by ABUS. Stage 2 240 outputs Digital Event Out 270.

Embodiment characteristics comprise event detection in the pixel using programmably processed signal data, both temporal and/or spatial. Detector 205 produces asynchronous and synchronous integrated outputs. Signal processing (low pass filter) occurs in-pixel using Switched Capacitor Filter (SCF) 210. Embodiments filter signals from the same pixel, with different times. Embodiments filter signals from other pixels using an analog bus network 265. Signal subtraction or differencing is accomplished in-pixel using an offset subtraction circuit 245, which also removes comparator 225 offsets. Offset subtraction uses one dedicated offset capacitor. A cascode buffer 235 is included in the comparator design to remove some coupling of the comparator output to the input, while maintaining the full input voltage range. Also included is circuitry for the processor layer to implement event dependent offset update, enabling event dependent offset reset by the event detecting ROIC input circuits. This provides flexible and precise signal processing before generating events, and makes multiple types of events possible.

ROIC pixel embodiments use synchronous integration and/or asynchronous data for event detection. They employ signal processing (low pass filtering) of multiple instances of pixel data for use in event detection. Processed spatial and/or temporal data is used for event detection. They include the ability to program multiple types of processing and thresholds 250 for event detection in a pixel. An advantage of these capabilities is to allow use of the full sensitivity of the detector 205 when doing the signal processing for event detection. In embodiments, event detection is based only on temporal changes reducing sensitivity first, before processing. ROIC pixel embodiments use one amplifier in a pixel, as both a comparator first stage, and an analog buffer for processing. The addition of a buffer inside of the analog first stage 235 to drive the output cascode FET 240 isolates the inputs from feedback due to capacitance from the active FET gate to drain (Miller capacitance). This buffer allows the input and output to cover the full voltage range while continuing to provide isolation.

In embodiments, the comparator offset 245 is not affected by use in processing and comparisons, and the buffered output 270 can include amplifier offset cancellation for accurate spatial comparisons. Embodiments input to SCF 210 directly from Integration Sample and Hold Voltage (VSH) (no need to store offset in SCF). The VSH capacitor can be used for temporary storage of SCF data when doing spatial transfers. One SCF 210 accomplishes horizontal and/or vertical transfers simultaneously.

In embodiments, events are based on difference detection of detector output or Switched Capacitor Filter (SCF) 210 compared to previous offset calibration 255. Offset calibration 255 can be based on either: 1) Current detector output (either synchronous integration sample and hold or real time asynchronous logarithmic), or 2) Current SCF 210 output. Offset calibration 255 can be initiated globally by ROIC layer, or based on pixel events using the processor layer. The SCF 210 output can be a direct sample of one input, or the filtered output of a sequence of input data. The sequence of data can be temporal or spatial data (SH or SCF) from the same or neighbor pixels. Embodiments cannot write and read from one SCF 210 simultaneously. In a data transfer between pixels, one pixel is a source and another pixel is the destination. Events can also be fed into the SCF 210 to measure event density. For embodiments sync SH is usually a current integration, but can be other data buffered from the SCF 210 or other pixels. In Binning Mode, two rows in 2×2 bin can have different processing, and two columns in 2×2 bins can have different thresholds 250. There are four regions of processing timing defined by rows.

Pixel embodiment components comprise: a Buffered Direct Injection (BDI) input circuit, a Comparator-Buffer 225, a Switched Capacitor Filter 210, an Analog Bus (ABUS) 265, and Event readout 270. The BDI input circuit provides synchronous integrated output (typical use), and asynchronous logarithmic 220 output for event detection. Regarding the Comparator-Buffer 225, the first stage analog amplifier 235 is used as a comparator front end or as a buffer. The second digital stage 240 is for the comparator only—to create more gain. The SCF 210 can be used for temporal filtering of successive synchronous integration outputs to generate a signal to noise ratio close to that obtained by a larger well capacity and longer integration time in a smaller layout area (a use of this circuit in other ROICs). In this circuit, it can also be used for spatial filtering or sampling of data transmitted with the analog bus. The ABUS 265 has a buffer that can be connected to drive the SCF 210 inputs of other pixels or out of the pixel array to readout. Regarding Event readout 270, the main event readout is to the second processor layer, and there are also two test readouts.

Regarding Comparator 225 operation details, the analog first stage 235 is basically a standard five FET differential amplifier, but using composite FETs and with an extra cascode buffer for the cascode of the output composite FET. The cascode buffer prevents any charge from getting into the offset node on the negative input by keeping the gate to drain capacitance constant regardless of the amplifier output. Since amplifier input can be over a wide range, a fixed external cascode voltage cannot be used to do this. When the first stage is used as a buffer, unity gain feedback from the output to the negative input is used to configure it as a unity gain differential follower. When the first stage is a comparator, this feedback is disabled. A capacitor is in series with negative input which stores an offset voltage using buffer mode. This offset voltage is created by feeding back the comparator output to the negative input: VTH_EN 250 & CAL_OFST 255 on. The offset voltage is the difference between an external reference voltage (VTH_IN) and the output of the amplifier, which is equal to the voltage on the positive input and the amplifier offset voltage. In embodiments, this offset stores just the amplifier offset, or it can include signal data, either the detector 205 output or the SCF 210 output. The amplifier can use this offset in both comparator and buffer modes. The second stage amplifier 240 is two inverters in series. The inverters are current-limited to prevent excessive transient currents. For embodiments, there are also switches that change configuration of the inverters from two series inverters to a latch configuration, which ties the output of the second inverter to the input of the first inverter. In the latch configuration, the input is disconnected from the first stage so the two outputs do not fight each other. The second stage amplifier 240 comprises two series inverters comparator: COMP_IN on, and LATCH off. For the Latch mode, this is: COMP_IN off, LATCH on.

Figure 3:
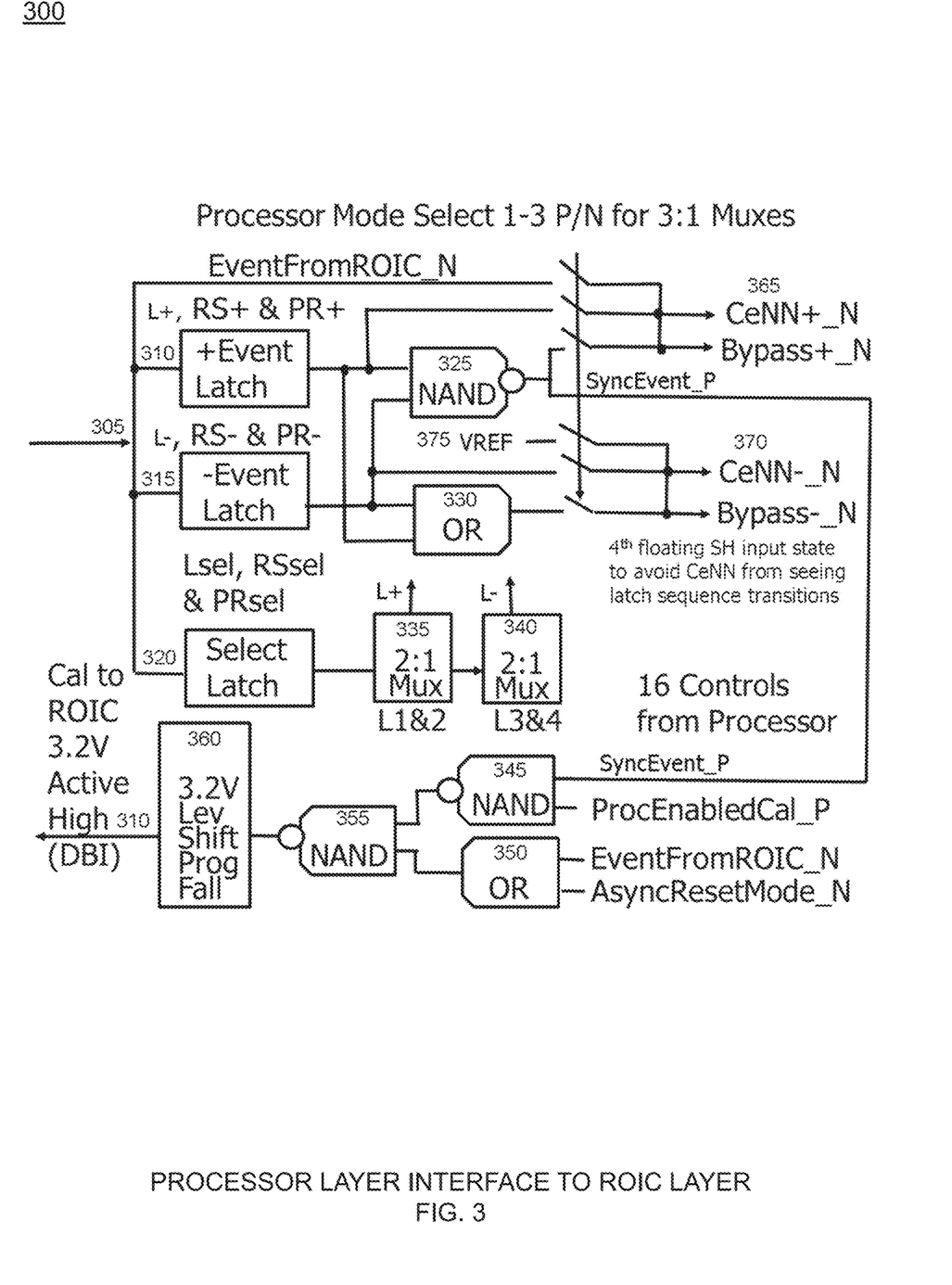
FIG. 3 is a processor layer interface to ROIC layer block diagram configured in accordance with one embodiment.

FIG. 3 is a processor layer interface to ROIC layer block diagram 300. From an interconnection perspective, components comprise: input Event from ROIC Layer 1.2V Active Low (connects between layers using DBI) 305 to +Event Latch 310, −Event Latch 315, and Select Latch 320. Outputs from +Event Latch 310 and −Event Latch 315 are input to NAND 325 and OR 330. Output from Select Latch 320 is input to 2:1 Mux for L1 & L2 335, whose output is input to 2:1 Mux for L3 & L4 340. A SyncEvent_P output from NAND 325 along with a ProcEnabledCal_P signal are input to NAND 345. NAND 345 and OR 350 outputs are input to NAND 355. NAND 355 output is input to 3.2V Level Shift ProgFall 360, whose output is a Cal to ROIC 3.2V Active High (DBI) signal.

Regarding operation, the processor layer interface to the ROIC layer 300 performs a Synchronous or ASynchronous Reset/Cal. Starting, the ROIC sends an active low event. The event is sampled twice in the processor layer to generate two events that form a trinary input to the Cellular Neural Network (CeNN) (365 & 370). The CeNN differential input is trinary, active low, having the three states of: CeNN+−: '10'=−1 (neg VTH), '11'=0, '01'=+1 (pos VTH). There are three modes selected 320 by the processor layer: 1) Direct, 2) Latched, and 3) Latch+Logic. 1) Direct comprises an Async Reset Digital or Analog (async− or sync+), where a digital event or analog signal direct is sent to CeNN+ (365) input. VREF (375) is on the CeNN− (370) input. The input to the CeNN is binary in this mode. The input is 1.2V range limited in the ROIC layer, but analog levels won't drive any logic, and require logic inputs to be "off". Analog input reset/cal is by global cal clock only. 2) Latched comprises a Sync Change Detect with Reset Option. The Latched mode has 2:1 timing select based on other event latch or preset/reset—for temporal change with positive and negative thresholds which naturally excludes the '11' case. 3) Latch+Logic comprises Sync Using Two Event Types with Reset Option. This is like 2) Latched condition, except CeNN is a logical combination of two latches (325 & 330) rather than direct output-logically excludes the '11' case for trinary output proportional to number of events. The format is: CeNN+ (365) CeNN− (370). '10' is no event; '11' is one event of either type; and '01' is two events, both types.

Continuing, the processor layer enables recalibrating the offset only when an event is detected using logic (345, 350, 360, 365). NAND gate 345 enables offset recalibration for latched events. OR gate 350 enables event driven offset recalibration in Direct mode. Gate 360 combines the two cases, and level shifter 365 shifts the signal to the levels required for the ROIC layer. Bypass routes signals around the CeNN for lower latency. There is also logic allowing a latched event output to select which events will be used for the CeNN inputs (320, 335, 340) The select latch 320 latches an event whose stored output then selects among two latch clocks for the two event data latches 310 and 315. The different timing is used to store different types of events in the events latches 310 and 315. For example, different thresholds might be used for events for times L1 and L3 than for times L2 and L4. RS (reset) and PR (preset) controls allow the processor to set the state of these three latches independently from the ROIC layer.

Figure 4:
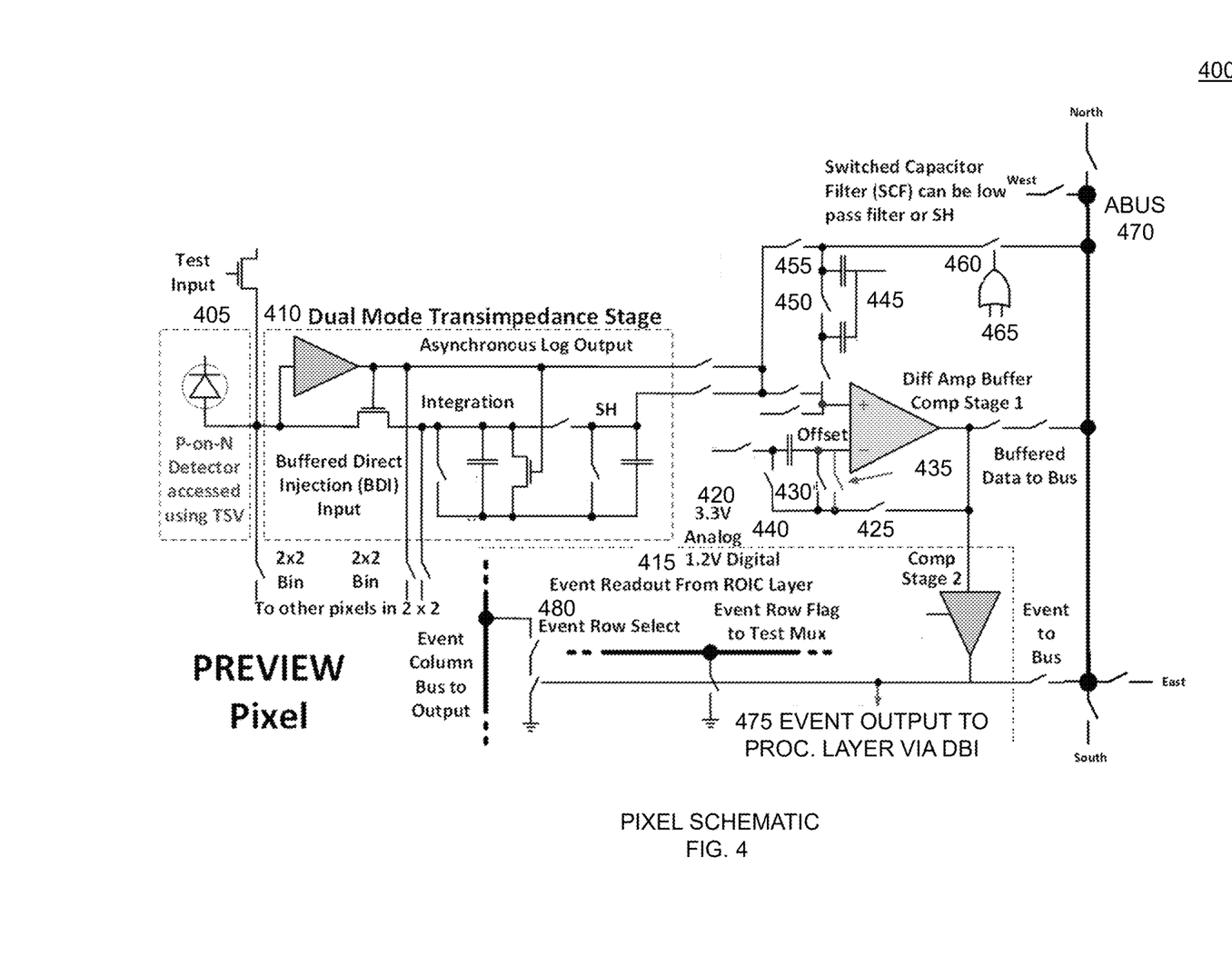
FIG. 4 is a pixel schematic configured in accordance with one embodiment.

FIG. 4 is a pixel diagram 400 according to one embodiment. Components comprise a P-on-N detector 405 that is accessed by the Through Silicon Via (TSV) 405. A Dual Mode Transimpedance Stage 410, a Digital Event Readout segment from ROIC Layer 415, and an Analog segment 420. This provides programmable temporal and spatial event processing with a buffered analog bus (ABUS), filtering, and offset subtraction. Configuration switches allow offset buffer or compare of async output, sync SH output, or SCF.

In this figure, some details of the comparator first stage switching for the different modes of operation are described. If the comparator first stage is being used as a comparator, then the unity gain feedback is off. The switch labeled "Buffer or Cal" 425 is open. It the comparator first stage is being used as a buffer to ABUS or as a buffer for offset calibration, then the "Buffer or Cal" 425 switch is on. If the buffer is being used for offset calibration, then this calibration occurs by turning on switch "Cal" 430 for ROIC layer controlled offset or "DBI Enabled Cal" 435 for Processor layer controlled offset calibration. If the comparator first stage is being used as a buffer for ABUS, then the switch "Buffer w/Cal" 440 switch is on and the other calibration switches are off.

One side of the offset capacitor is not switched, except for calibration. There is one offset capacitor at the minus input. It can store amp offset or signal+amp offset. The buffered output includes comparator offset cancellation, resulting in accurate spatial processing.

FIG. 4 also shows that the circuit for the SCF is composed of two capacitors 445 with a switch 450 between them. There are also switches to allow connection to the SCF directly from the detector, "VSH to SCF" 455 and from the ABUS "ABUS to SCF" 460. The ABUS switch is controlled by the row and column bus so that the ABUS is only connected in a pixel if both the row and column busses are active. In this embodiment implementation, row and column ABUS to SCF select busses "Row" and "Column" 465 are active low. Embodiments use SH for storing data from the bus in spatial processing.

The wide connection on the right of the figure is the analog bus 470, referred to as ABUS. Four switches are displayed to show the connections of this bus to the ABUS of the four directly adjacent pixels, labeled North, South, East, and West. While four switches are shown, the actual implementation in each pixel only requires two switches as the switches are shared between the two pixels that they connect, so two switches per pixel is sufficient to have switches in all four directions.

FIG. 4 also shows the direct event outputs in the ROIC layer as well as the event output to the processor layer, "Event Output to the Processor Layer via DBI" 475. There is an event row flag output bus which is pulled down while the event output is high. This event output is part of the internal test circuitry and is used for more accurate measurements of the event timing. There is an event column data bus that is pulled down if an event is high and the row is selected for output with "Event Row Select" bus 480. This is another internal test capability; these column busses go to outputs on the bottom edge of the ROIC layer.

Figure 5:
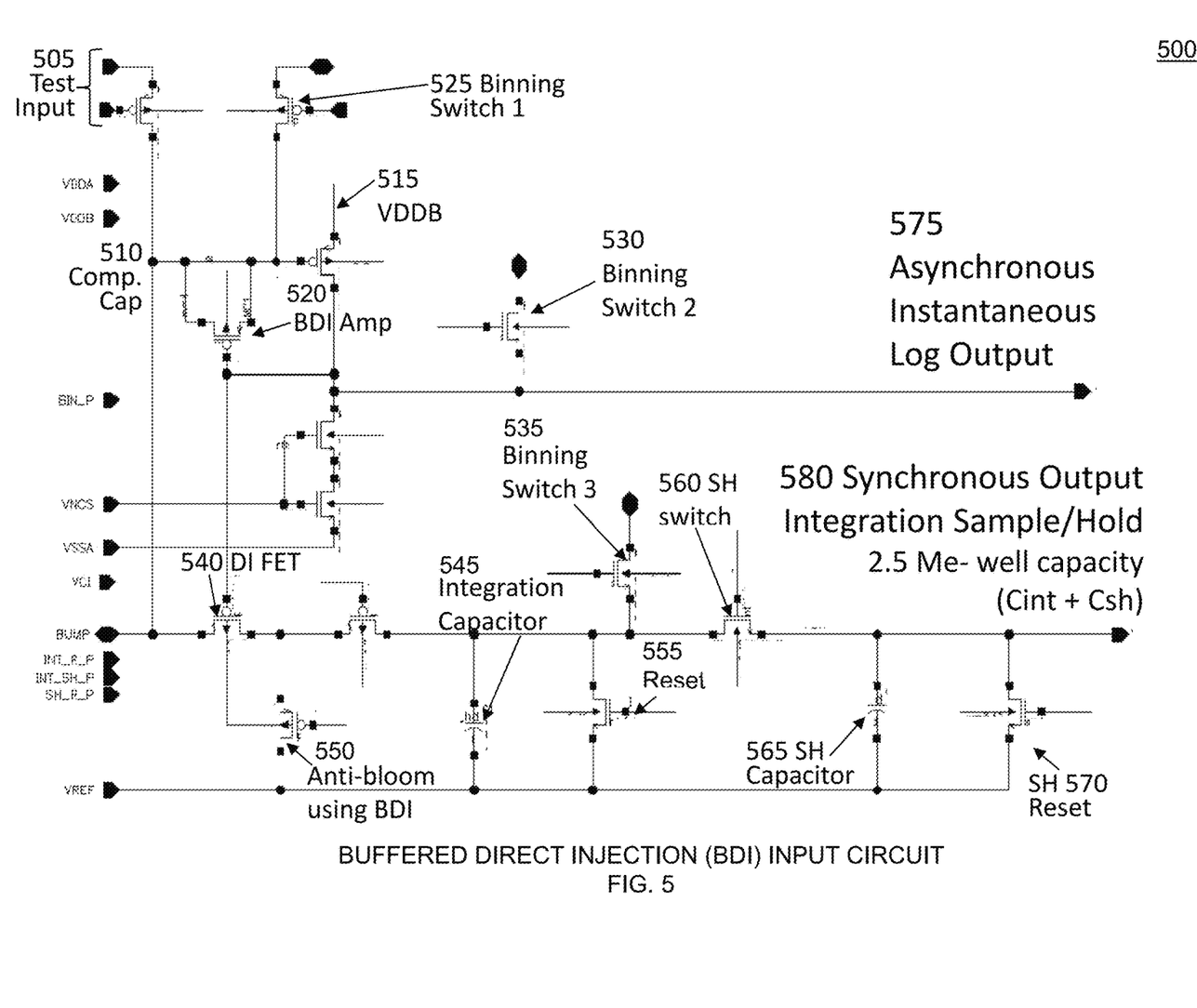
FIG. 5 is a buffered direct injection (BDI) input circuit configured in accordance with one embodiment.

FIG. 5 depicts a buffered direct injection (BDI) input circuit 500. From an interconnection perspective, components comprise: test input 505; compensation capacitor 510 which is implemented using a FET, the BDI amplifier 520 comprising all the FETs between VDDB 515 and VSSA, binning switch 1 525; binning switch 2 530; binning switch 3 535; direct injection (DI) FET 540; integration capacitor 545; anti-bloom FET 550; sample/hold (SH) switch 560; SH capacitor 565; and SH reset 570. Outputs comprise asynchronous instantaneous log output 575 and synchronous output integration sample/hold 580.

Operationally, the BDI circuit maintains a constant detector bias while current is flowing through the DI input FET. For embodiments, the integration capacitor is periodically read out and reset. Reset 505 resets the integration capacitor. SH switch 560 connects the integrated signal charge to the SH capacitor. SH reset 570 resets the SH capacitor prior to sampling the next integrated signal voltage. The BDI input includes a cascode FET connected to VCI for BDI isolation from reset transient voltages and an anti-bloom FET which shunts current around the integration capacitor when the integration capacitor voltage gets high enough to begin to shut off the DI FET (DI FET drain to source voltage gets too low). In anti-blooming, the BDI amplifier output will continue to drop to increase current, eventually turning on the anti-bloom FET to sink all the input current while continuing to maintain the input bias voltage. Embodiments have two ouputs: VBDI 575 and VSH 580. VBDI 575 is an asynchronous logarithmic output, and VSH 580 is a sampled integrated current output. The pixel includes a sample and hold (SH) for overlapping integration and processing. The sampled signal from the previous integration time can be used for processing while the next signal is integrated. The input includes switches for 2×2 binning. Binning enables a group of four pixels to combine their detector currents into one detector output, for both asynchronous and integrated outputs. The comparators and SCF can be programmed to do four different simultaneous operations using the combined detector outputs, either asynchronous or synchronous integrated.

Regarding details, BDI operation comprises a Direct Injection (DI) FET 540 maintaining the bias of the detector at a constant voltage while passing the current onto a high impedance integration node that has the integration capacitor 545 and a reset switch 555. The buffer of the BDI input circuit increases the gain of the DI FET 540, improving its performance. Since the subthreshold transconductance of the FET 540 is exponential, the BDI amplifier 520 which compensates for that transconductance gain using feedback is logarithmic—this asynchronous output 575 is continuously output, regardless of integration operations. The synchronous integrated output 580 is generated using the following sequence: 1) The integration capacitor 545 is reset by turning the reset FET 555 on and off; 2) The detector current is integrated on the integration capacitor 545 only-during this time the SH capacitor 565 has the previous integration time's signal on it and can be used for signal processing and event detection while integration of the next frame goes on; 3) The SH capacitor 565 is reset by turning the SH reset switch 570 on and off; 4) The SH capacitor 565 is connected to the integration capacitor 545 so that integration occurs on both of these capacitors; and 5) The SH switch 560 is opened so the integrated output is stored on the SH capacitor 565. The anti-bloom circuit 550 uses the BDI amplifier 520 feedback to turn on an additional FET that bypasses the integration capacitor 545 when the integration voltage gets so high that the input FET drain to source is too low to sink all the detector current. This additional FET turns on just enough to allow the DI FET 540 to continue to maintain the detector bias, which can prevent charge spreading between detectors.

Figure 6:
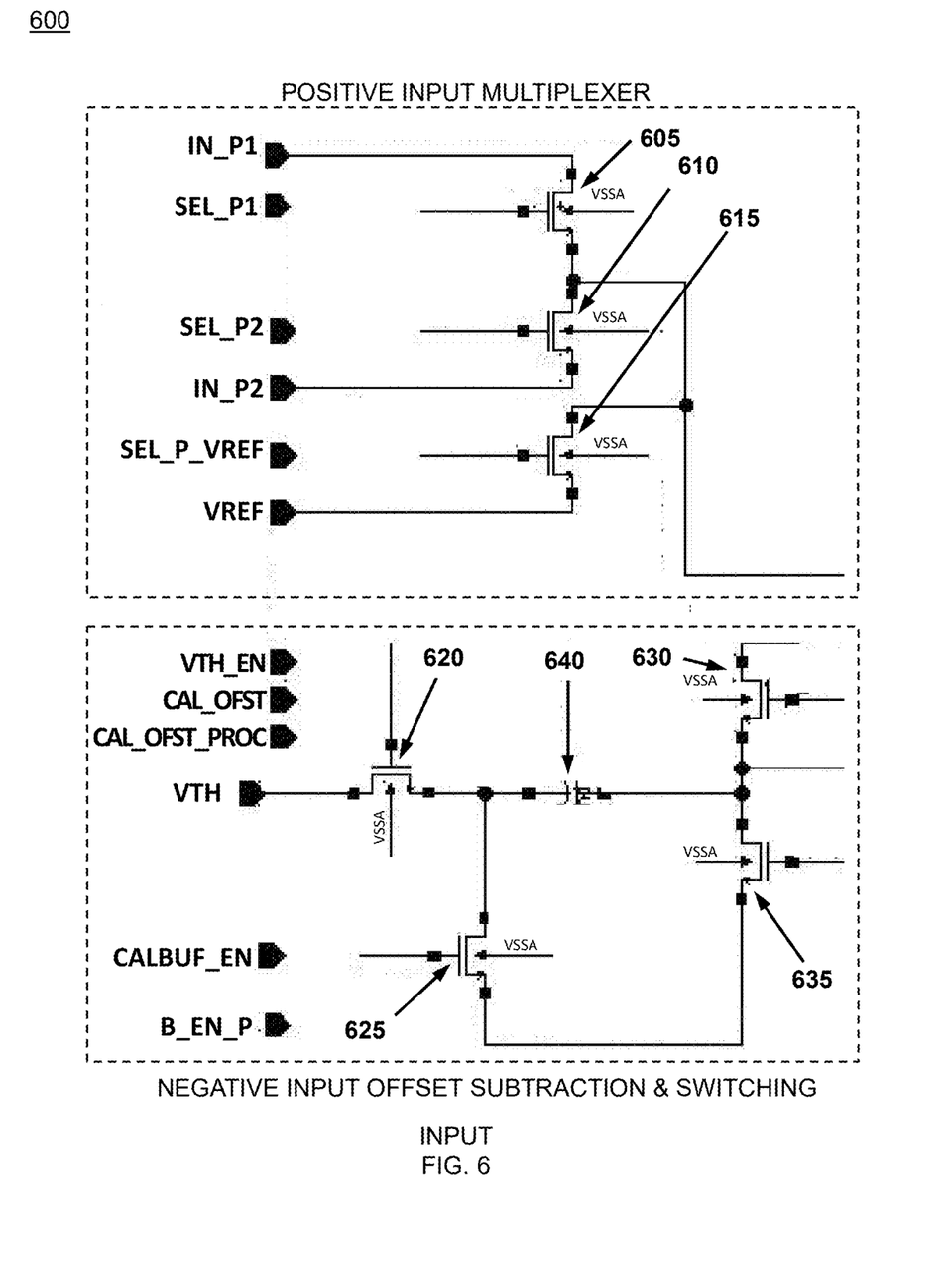
FIG. 6 depicts an input circuit configured in accordance with one embodiment.

FIG. 6 depicts a positive input multiplexer and negative input offset subtraction and switching input circuit 600. Devices in the positive input multiplexer section comprise switches to form a 3 to 1 multiplexer P1 switch Field Effect Transistor (FET) 605, P2 switch FET 610; and reference FET 615. One of the three inputs, P1, P2, or VREF, is selected to connect to the positive input of the comparator, IN_P.

Devices in the negative input offset subtraction and switching section comprise threshold switch FET 620; calibrated buffer switch FET 625; processor calibration offset switch FET 630; and calibration offset switch FET 635. Threshold switch FET 620 selects the VTH input as a calibrated input to the comparator negative input, IN_N. It is calibrated by being in series with the offset capacitor 640. Switch 625 selects the first stage output as the calibrated input to the comparator, implementing an offset calibrated buffer. Switches 630 and 635 comprise two different options for calibrating the offset capacitor. Both do the same thing, but are controlled by different sources. Switch 635 is controlled by the ROIC layer, like all the other signals. Switch 630 is controlled by the processor layer, which has additional functionality, allowing previous events to control whether a new calibration should occur. To implement a calibration, switch 620 is on and VTH is set to a zero signal reference level. When the desired calibration voltage is present at IN_P, either offset calibration switch 630 or 635 is turned on to store the new offset calibration voltage. Then, switch 620 is turned off followed by the offset calibration switch.

Figure 7:
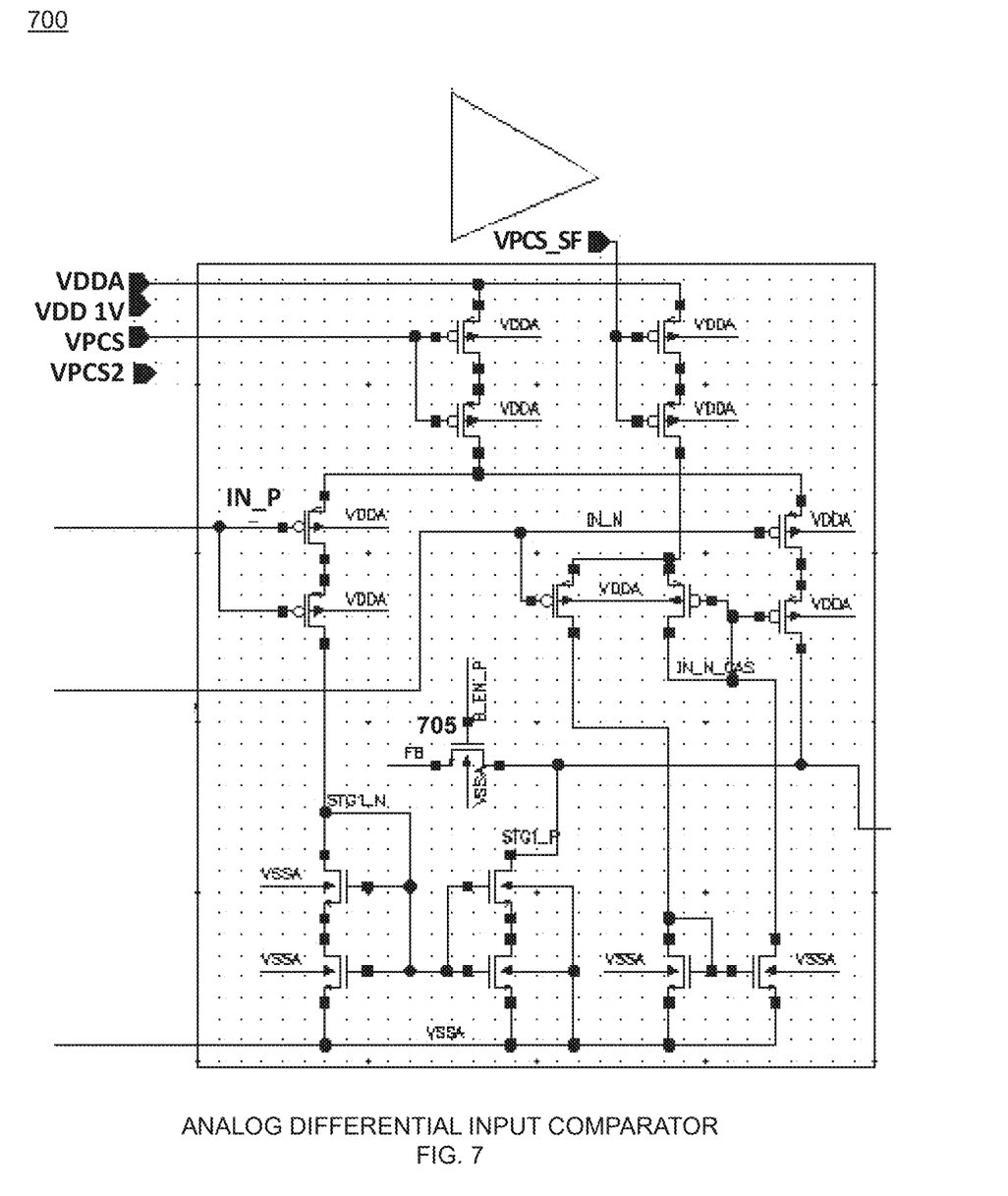
FIG. 7 depicts an analog differential input comparator circuit configured in accordance with one embodiment.

FIG. 7 depicts an analog differential input comparator circuit 700. Analog differential input comparator circuit 700 receives inputs from positive input multiplexer and negative input offset subtraction and switching circuit 600. Among inputs are VDDA, VDD 1V, VPCS, and VPCS_SF. The analog first stage is basically a standard five FET differential amplifier, but using composite FETs and with an extra cascode buffer for the cascode of the output composite FET. The cascode buffer prevents any charge from getting into the offset node on the negative input by keeping the gate to drain capacitance constant regardless of the amplifier output. Since amplifier input can be over a wide range, a fixed external cascode voltage cannot be used for the cascode. When the first stage is used as a buffer, unity gain feedback from the output to the negative input is used to configure it as a unity gain differential follower with the B_EN_P switch 705. When the first stage is a comparator, this feedback is disabled.

Figure 8:
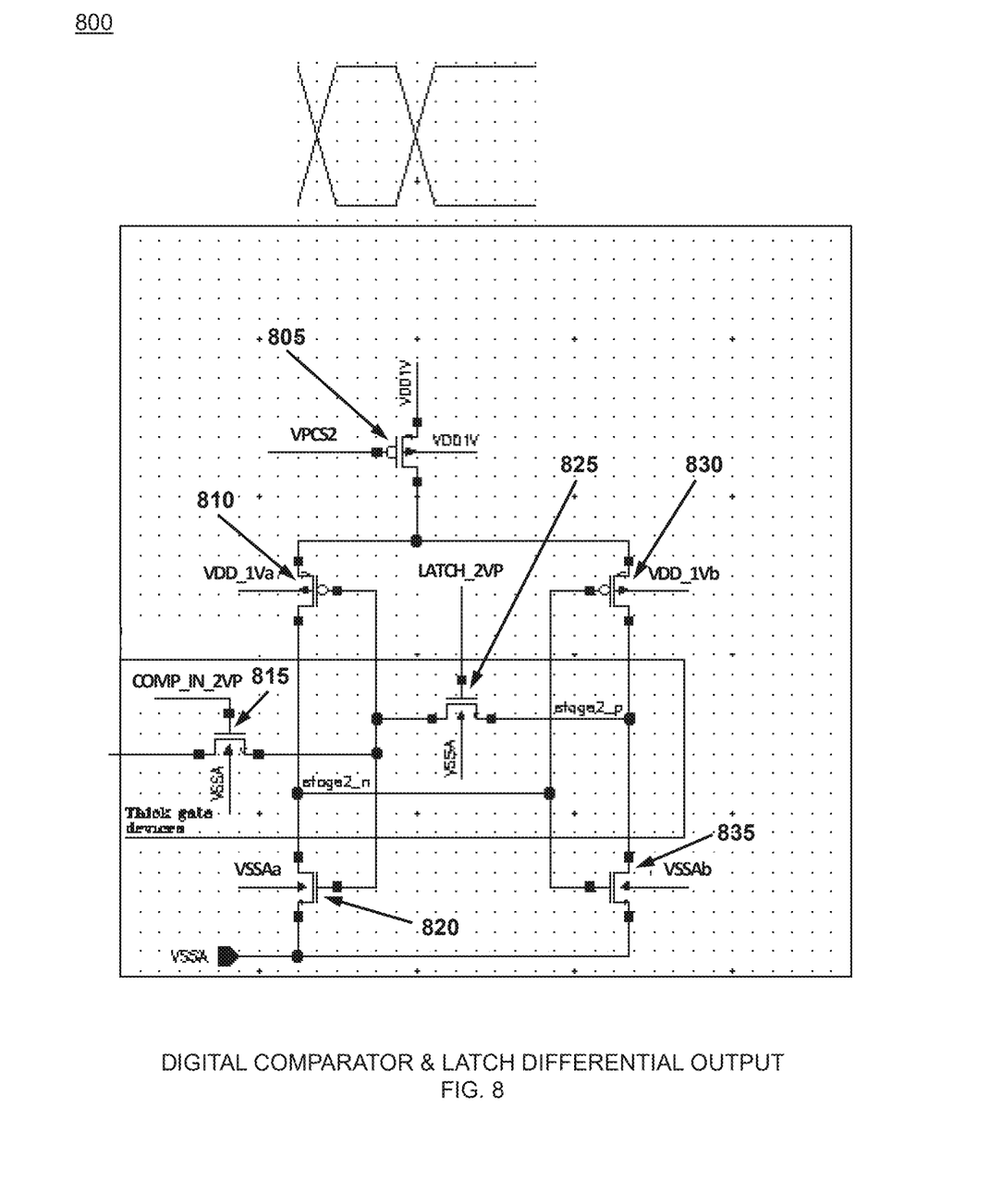
FIG. 8 depicts a digital comparator and latch differential output circuit configured in accordance with one embodiment.

FIG. 8 depicts a digital comparator and latch differential output circuit 800. Devices in the digital comparator and latch differential output section comprise VPCS2 FET 805; VDD1Va FET 810; COMP_IN_2VP FET 815; VSSAa FET 820; LATCH_2VP FET 825; VDD_1Vb FET 830; and VSSAb FET 835. The second stage amplifier is two inverters in series. The inverters are current-limited to prevent excessive transient currents by current source FET 805 whose current is set by bias VCS2. For embodiments, there are also two switches that change the configuration of the inverters from two series inverters to a latch configuration, which ties the output of the second inverter to the input of the first inverter. In the latch configuration, the input is disconnected from the first stage so the two outputs do not fight each other. The COMP_IN switch that connects to the first stage input 815 has a reduced voltage level so that the higher analog voltages of the first stage (STG1_P) do not appear on the gates of lower voltage devices of the second stage, 810 and 820. The LATCH switch that connects the input to the output 825 uses the same lower level to save power. Since COMP_IN and LATCH form a 2:1 multiplexer, only one is on at a time, except for a very brief overlap. When COMP_IN is high, the second stage is in comparator mode. When LATCH is high, the second stage is in latch mode. The second stage has two outputs of opposite polarity: stage2_p and stage2_n which go to the output polarity mux in FIG. 9.

Figure 9:
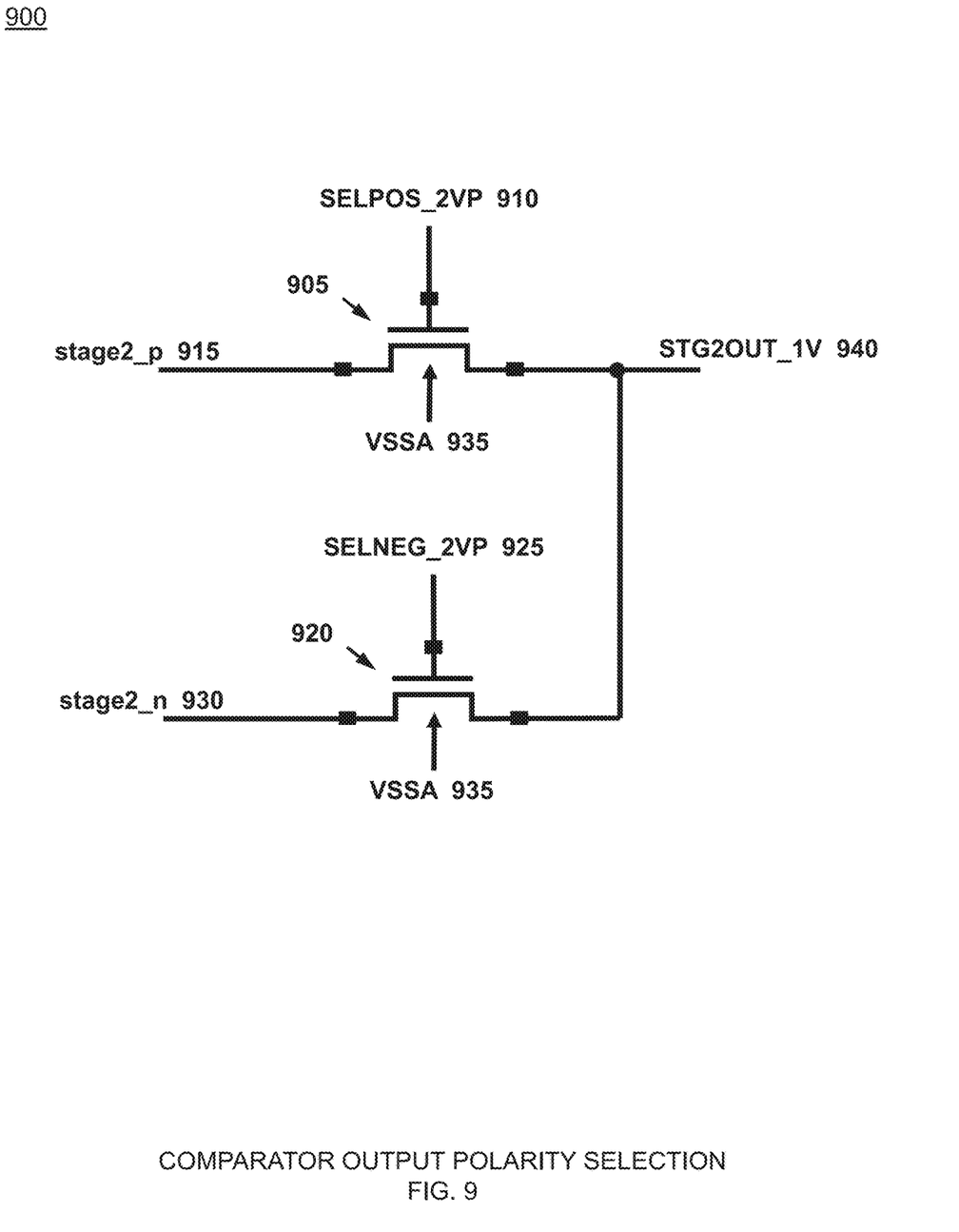
FIG. 9 depicts a multiplexer output polarity selection component configured in accordance with one embodiment.

FIG. 9 depicts comparator output polarity selection 2:1 multiplexer 900. FET device 905 comprises gate SELPOS_2VP 910 which selects the positive polarity of output (stage2_p) 915 when high. FET device 920 comprises gate SELNEG_2VP 925 which selects the negative polarity of output (stage 2_n) 930 when high. Only one polarity is selected at one time. The NFET substrate is VSSA 935 for all NFETs; the two switch FETs connect to the output of the comparator, STG2OUT_1V 940. The gates of 905 and 920 are also voltage limited so that the latch outputs never see greater than 1.2V.

For embodiments, ROIC circuit algorithms generate events. Seven algorithm examples include: 1) Change detection of async output compared to global or processor-enabled calibration-high or low. 2) Change detection of sync integration compared to global or processor-enabled calibration-high and low. 3) Change detection of sync integration outputs (fast change) and temporally filtered outputs (slow change)—high and low with different thresholds but same offset reference. 4) Compare difference in change of pixel with average change of selected neighbors. The filter output is preset to the first value in when starting the filter to insure full voltage gain. 5) Compare the difference of the pixel output value with the average output value of selected neighbors, for up to about 10 pixels. 6) Filter events and compare to threshold. Measure event density, and create an event based on event density. 7) Two-threshold CFAR algorithm that measures changes against four different thresholds, and updates the offset on an event. Embodiments measure event density and use event density to decide which +/− pair of thresholds to use.

The foregoing description of the embodiments has been presented for the purposes of illustration and description. It is not intended to be exhaustive or to limit the invention to the precise form disclosed. Many modifications and variations are possible in light of this disclosure it is to be understood that other similar embodiments may be used or modifications or additions may be made to the described embodiment for performing the same function of the present invention without deviating therefrom. It is intended that the scope of the invention be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A neuromorphic focal plane array (FPA) Read Out Integrated Circuit (ROIC) device for image event processing, comprising:
a detector array;
an analog detection layer; and
a digital event processing layer;
wherein a detector circuit of said analog detection layer performs spatio-temporal event detection;
wherein output of pixels of said detector array is processed by the detector circuit of said analog detection layer to detect events, providing a spatio-temporal event detection output to a digital event processing circuit of said digital event processing layer which outputs event information;
wherein said spatio-temporal event detection comprises temporal and spatial synchronous and asynchronous image event processing, and provides an asynchronous logarithmic output voltage and a synchronous integrated signal output voltage;
wherein an offset capacitor in said detector circuit is configured to store one of the asynchronous logarithmic output voltage or the synchronous integrated signal output voltage; and
wherein said offset capacitor is in series with a threshold switch which selects a threshold voltage input as a calibrated input to a negative input of said comparator.

2. The device of claim 1, wherein said event information comprises detection, tracking, and identification data.

3. The device of claim 1, wherein a comparator in said detector circuit is configured to compare the asynchronous logarithmic output voltage or synchronous integrated signal output voltage to a programmable threshold to generate an event detection signal in a pixel, which is output from said ROIC.

4. The device of claim 3, wherein when said comparator is configured to operate as a unity gain buffer, unity gain feedback from an output to a negative input is used to configure said comparator as a unity gain differential follower.

5. The device of claim 1, comprising:
a switched capacitor filter (SCF) in said detector circuit whereby the asynchronous logarithmic output voltage and the synchronous integrated signal output voltage are filtered, thereby generating signals providing an offset or an input to a comparator in said detector circuit.

6. The device of claim 5, wherein offset calibration is based on either: a current detector output; or a current SCF output, and said offset calibration is initiated globally by an ROIC layer, or based on said events.

7. The device of claim 6, wherein said events are based on a difference detection of the current detector output or the current SCF output compared to a previous offset calibration.

8. The device of claim 5, wherein said detector circuit further comprises:
an analog bus (ABUS) which connects an output of each of a pixel unity gain buffer to an input of an SCF of other pixels, the ABUS comprising horizontal and vertical switches to allow pixels to transfer data to other pixels, with a plurality of pixels transferring simultaneously along different sections of the ABUS, separated by open switches;
whereby said events are generated in said pixels of said ROIC by spatial processing comprising comparing said pixel data among pixels selected by said horizontal and vertical switches.

9. The device of claim 1, wherein said detector circuit comprises a dual mode transimpedance stage comprising a Buffered Direct Injection (BDI) input.

10. The device of claim 1, wherein said detector circuit comprises a dual mode transimpedance stage comprising a Buffered Direct Injection (BDI) input, an integration capacitor, and a Sample and Hold (SH), whereby an asynchronous log output is produced.

11. The device of claim 1, wherein said ROIC comprises one amplifier in a pixel, as both a comparator first stage and an analog buffer for processing.

12. A method for neuromorphic image event processing comprising:
providing a detector input circuit in a Read Out Integrated Circuit (ROIC) comprising an asynchronous logarithmic output and an integrated signal output;
providing an offset capacitor circuit configured to store either an asynchronous output voltage or a synchronous output voltage;
providing a comparator circuit configured to compare a current detector's asynchronous or synchronous output to an output voltage of said offset capacitor circuit using a programmable threshold to generate an event detection signal in a pixel, which is output from said ROIC, wherein said comparator circuit is configured to operate as a unity gain buffer;
providing a switched capacitor filter (SCF) whereby multiple detectors' outputs are filtered, generating signals providing an offset or an input to said comparator circuit, whereby events are generated for output from said ROIC;
providing an analog bus (ABUS) which connects an output of each of a pixel's unity gain buffers to an input of SCF of other pixels, said ABUS comprising horizontal and vertical switches to allow pixels to transfer data to other selected pixels, with a plurality of pixels transferring simultaneously along different sections of said ABUS, separated by open switches;
comparing based on one detector signal input enabling generation of multiple events with different meanings, distinguishable by timing, wherein different comparisons use multiple comparator thresholds; and
outputting from said ROIC the event detection signal;
wherein the offset capacitor circuit is configured to store one of the asynchronous output voltage or synchronous output voltage and where said offset capacitor circuit is in series with a threshold switch which selects a threshold voltage input as a calibrated input to a negative input of the comparator circuit.

13. The method of claim 12 wherein said different comparisons are based on multiple types of signals generated from one synchronous set of detector data.

14. The method of claim 12 comprising comparing direct detector output followed by comparing a signal generated by an input of multiple detector inputs to said SCF, including a latest detector output.

15. The method of claim 12, wherein a series of event outputs of a first kind from said comparator circuit are filtered in said SCF, wherein an output level of said SCF is compared against a programmable voltage to measure a proportion of events of a first kind which are high, generating a second type of event to be read out of said pixel.

16. The method of claim 15 wherein said second type of event is used to make decisions about a sampling time of said first type of event in order to select different thresholds based on a number of events seen within each pixel.

17. A neuromorphic focal plane array Read Out Integrated Circuit (ROIC) system for temporal and spatial synchronous and asynchronous image event processing comprising:
an ROIC layer;
a processor pixel layer interfaced with said ROIC layer; and
an Analog BUS (ABUS) for data transfer;
said ROIC layer comprising:
a Buffered Direct Injection (BDI) input circuit;
a comparator-buffer;
a Switched Capacitor Filter (SCF); and
an event readout;
wherein said BDI input circuit comprises an Integration Sample and Hold Voltage (VSH) capacitor providing temporary storage of SCF data when performing spatial transfers;
wherein said ROIC layer comprises one amplifier in a pixel as both a comparator first stage and an analog buffer inside an analog first stage to drive an output cascode FET, isolating inputs from feedback due to Miller capacitance from an active FET gate to drain;
whereby events are based on difference detection of detector output or said SCF compared to previous offset calibration, said offset calibration initiated globally by said ROIC layer, or based on a pixel event from said processor pixel layer;
whereby temporal and spatial image data events are synchronously and asynchronously processed and output.

* * * * *